J. R. & J. R. Lambert Jr,

Sawing Machine.

No. 109,426. Patented Nov. 22, 1870.

Witnesses.
A. Bennerkendorf
L. S. Mabee

Inventer.
J. R. Lambert
J. R. Lambert Jr
per Munn & Co
Attorneys.

United States Patent Office.

JAMES R. LAMBERT, SR., AND JAMES R. LAMBERT, JR., OF ROCKVILLE, INDIANA.

Letters Patent No. 109,426, dated November 22, 1870.

IMPROVEMENT IN SAWING-MACHINES.

The Schedule referred to in these Letters Patent and making part of the same.

*To all whom it may concern:*

Be it known that we, JAMES R. LAMBERT, Sr., and JAMES R. LAMBERT, Jr., of Rockville, in the county of Parke and State of Indiana, have invented a new and improved Sawing-Machine; and we do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
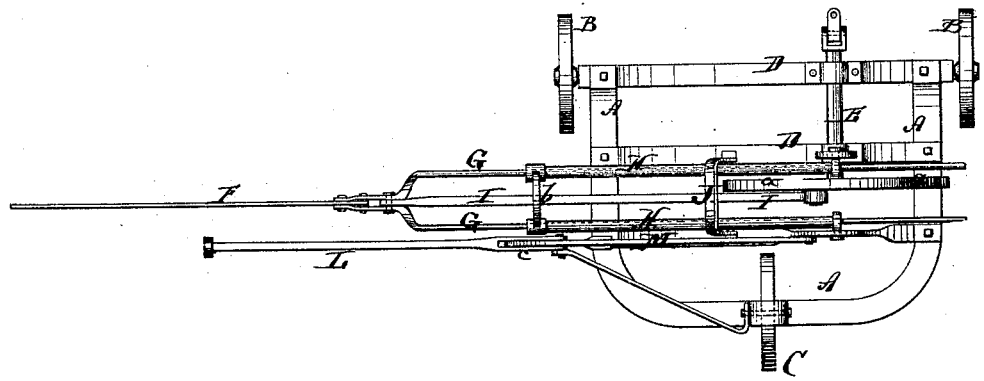
Figure 1 represents a plan or top view of our improved sawing-machine.
Figure 2:
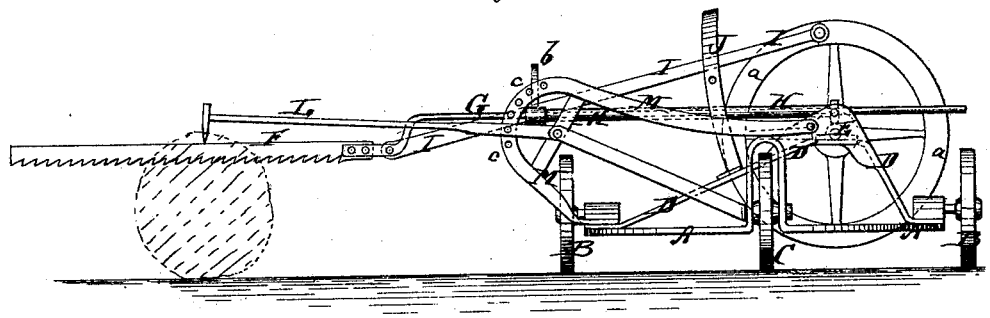
Figure 2 is a side view of the same.

This invention relates to a new sawing-machine, which is so constructed that the saw will be properly guided and not allowed to "whip," while it may clear itself of dust without choking.

The machine is supported by a frame, A, which rests on three wheels, B B, and C, the latter being the front wheel while the other two are in line.

The benches D D, which project from the frame A for supporting the crank-shaft E, are set so as to hold the said shaft nearer the outer than the inner end of the frame. Thereby the weight of the machine will be properly balanced, as the shaft E, with the flywheel a, &c., is on one side of the frame, and the saw, guide, &c., on the other. The jack or frame is thereby also prevented from tilting while it is being rolled along side of a log.

F is the drag-saw.

It is rigidly connected with a forked frame, G, which, with its two arms, enters two tubular guides, H H.

The latter are at their inner ends pivoted to the benches D.

A pitman, I, extends from a crank-pin of the shaft E to the front end of the frame or guide G.

The two outer ends of the tubes H may be connected or steadied by a projecting yoke, b, which will not interfere with the motion of the pitman.

J is a yoke, supported by the frame A so as to straddle the tubes H. It has a hole to permit the supporting of said tubes by a pin put through the same.

L is a dog, pivoted to a projecting frame or plate, M, which is properly held to and braced by the frame A, and which has a notched or perforated segment, c, for holding said dog at any desired elevation.

The dog serves to lock the frame or jack to the log while the saw is cutting the latter, and is, after a cut, released from the log.

The guide is then elevated to clear the saw from the log, and the whole frame moved along on the wheels opposite another part of the log to be cut. Then it is again anchored to the log.

The pitman being between the guides serves to steady the saw and prevent the same from whipping.

Having thus described our invention,

We claim as new and desire to secure by Letters Patent—

1. The tubular guides H H, combined with the forked guide G, saw F, and pitman I, substantially as herein shown and described.

2. The bifurcated handle G G fixedly attached to the saw, and the tubular guides H H pivoted at their back ends, combined with a crank-pitman pivoted at each end, as described.

JAMES R. LAMBERT, SR.
JAMES R. LAMBERT, JR.

Witnesses:
S. F. MAXWELL,
S. O. PRATT.